United States Patent Office 3,423,444
Patented Jan. 21, 1969

3,423,444
PROCESS FOR PRODUCING ALUMINUM ALKYLS AND ALPHA-OLEFINS
Mark T. Atwood, Ponca City, Okla., assignor to Continental Oil Company, Ponca City, Okla., a corporation of Delaware
Filed May 17, 1965, Ser. No. 456,296
U.S. Cl. 260—448       6 Claims
Int. Cl. C07f 5/06

ABSTRACT OF THE DISCLOSURE

The usual Poisson distribution curve of alkyl group size in aluminum alkyls by the growth process is shifted upwardly by a process which comprises alkylation of an aluminum dialkyl hydride with a mixture of low molecular weight alpha-olefins, the latter mixture being obtained by a displacement and subsequent separation of aluminum alkyl growth product, or from an extraneous source.

---

Figure 1:
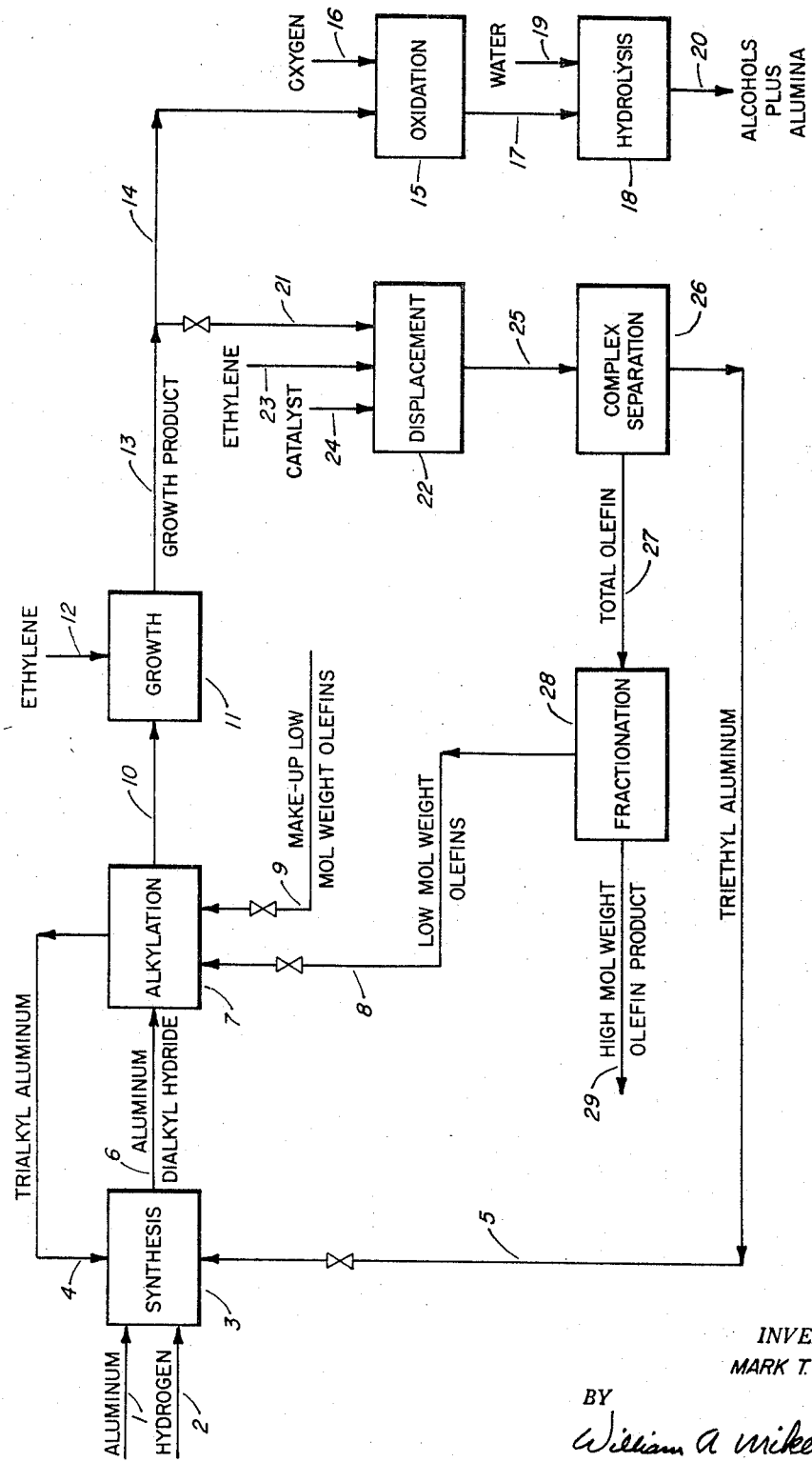

This invention relates to process for producing alcohols and additionally, if desired, olefins. In one aspect, the invention relates to process for upgrading a low molecular weight portion of olefins produced in an aluminum alkyl growth process by utilizing at least a portion thereof to alkylate a dialkyl aluminum hydride which is then subjected to the growth process. In another aspect, the invention relates to process for shifting the normal statistical distribtuion of alkyl group size in a growth process by feeding to the growth process a trialkyl aluminum in which the alkyl groups vary in size, the alkyl groups being derived by displacement of the growth product to produce mixed olefins, a portion of which is used to alkylate a dialkyl aluminum hydride and thus form the growth process feed.

The growth process, by which a low molecular weight trialkyl aluminum such as triethyl aluminum is reacted with a low molecular weight olefin such as ethylene, has recently became not only well-known but commercialized within the past few years. The trialkyl aluminum compounds which result from this growth reaction exhibit a size distribution of alkyl groups which is statistically fixed and which conforms to the Poisson distribution; although the curve is readily shifted so as to increase or decrease the average carbon chain size by controlling the number of olefin additions per aluminum molecule, the shape of the distribution curve remains fixed. The result has been that when one wishes to increase the output of a certain desired alkyl group size, the proportion of other less desired alkyl groups in the product has been dictated by this Poisson distribution. Two well-known uses for this growth product are preparation of straight-chain α-olefins and straight-chain 1-alkanols. The first is produced by displacing the growth product alkyl groups with a low molecular weight olefin, whereby there is recovered the Poisson distribution of α-olefins. The 1-alkanols are produced by oxidizing growth product to aluminum trialkoxides, which are then hydrolyzed to the 1-alkanols. Thus, whether the desired product is a 1-olefin or a 1-alkanol, it has been necessary to accept the Poisson distribution of products. When producing 1-olefins, the lower molecular weight product is particularly unattractive economically, since it typically comprises, e.g., 1-butene, 1-hexene and 1-octene. It would of course be desirable to find a method of upgrading these materials into more economically useful products. Similar low molecular weight olefins are also often available as refinery by-products, and it would be especially desirable to upgrade such materials.

Accordingly, an object of this invention is to provide a process for utilizing low molecular weight olefins in producing 1-alkanols. Another object of the invention is to provide a process for altering the distribution curve of a growth process. Yet another object of the invention is to provide a process for increasing the proportion of higher molecular weight alkyl groups in a growth process at the expense of lower molecular weight groups.

Figure 2:
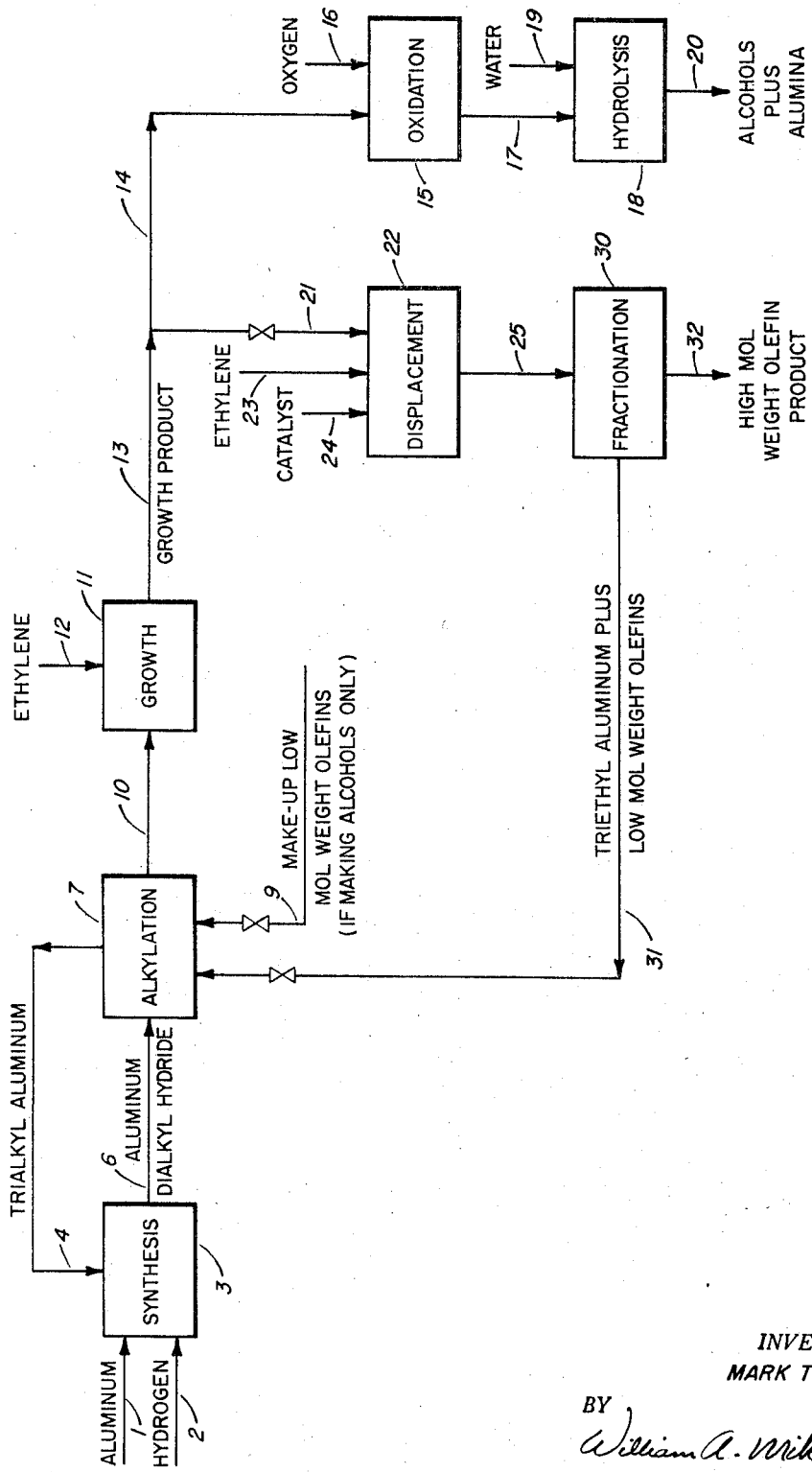
Figure 3:
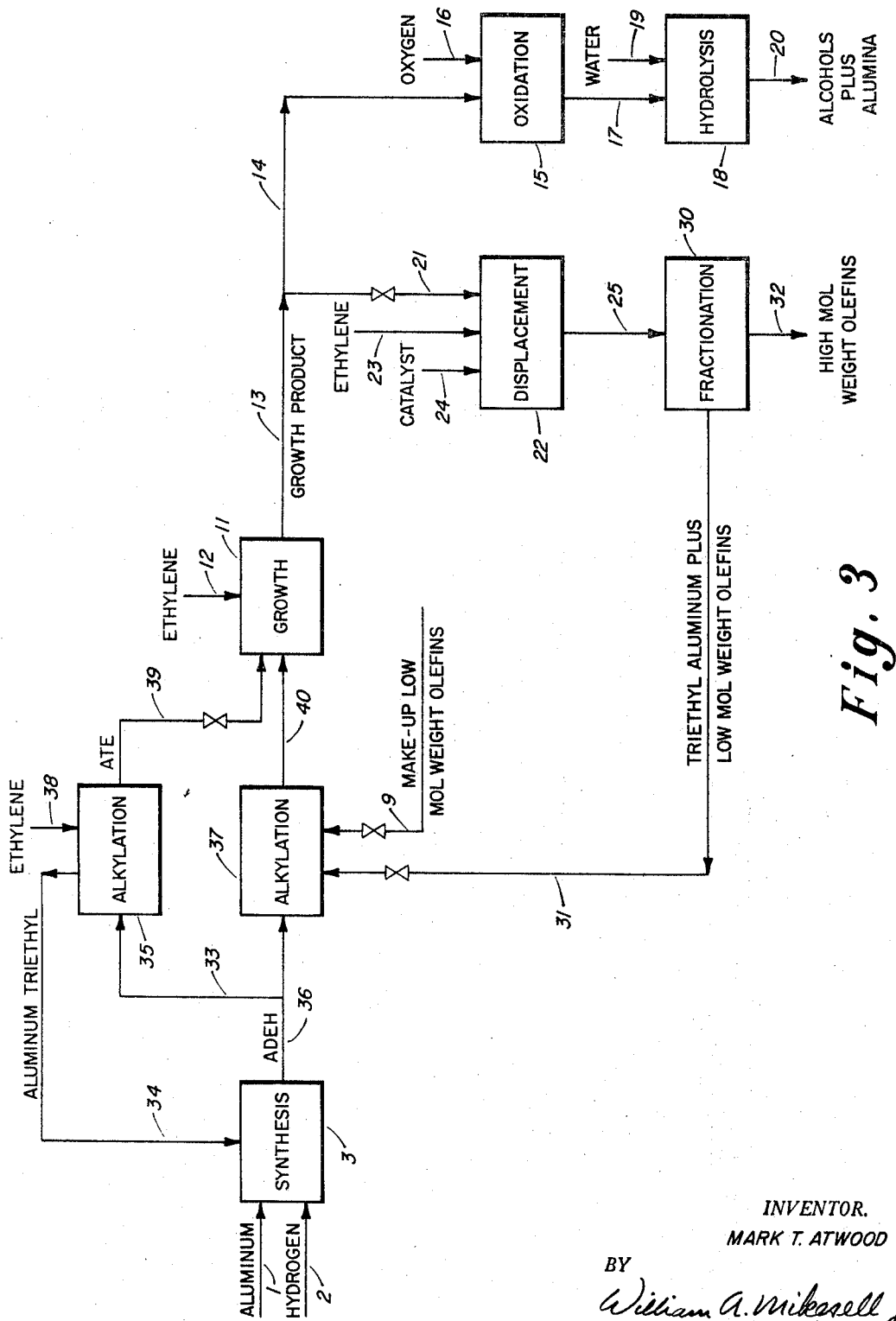

These and other objects are accomplished by the present invention, which will be more fully understood by reference to this disclosure, the appended claims, and the drawing, in which:

FIGURE 1 represents a flow diagram in schematic form of one embodiment of this invention, FIGURE 2 represents a flow diagram in schematic form of a second embodiment of this invention, and FIGURE 3 represents a flow diagram in schematic form of a third embodiment of this invention.

According to the invention, there is provided a process for producing alcohols from a mixture of low molecular weight α-olefins, the process comprising alkylating a dialkyl aluminum hydride with the mixture to produce mixed aluminum trialkyls, subjecting the mixed trialkyls to a growth reaction with, e.g., ethylene, oxidizing and hydrolyzing a portion of the growth product to produce the desired alcohols, subjecting another portion of the growth product to a displacement reaction, and returning at least a low molecular weight olefin portion of the displacement product to the alkylation. Another embodiment of the invention comprises reacting a mixed aluminum trialkyl with metallic aluminum and hydrogen to produce dialkyl aluminum hydride, alkylating the dialkyl aluminum hydride with mixed α-olefins to produce mixed aluminum trialkyl, returning a portion thereof to the first reaction, subjecting another portion thereof to a growth reaction with, e.g., ethylene, and oxidizing and hydrolyzing at least a portion of the growth product to the desired 1-alkanol.

A more complete understanding of the invention will be gained by reference to the drawing. Referring now to the drawing, and to FIGURE 1 in particular, metallic aluminum and hydrogen are fed by way of conduits 1 and 2 respectively to a synthesis zone 3. A mixed trialkyl aluminum compound is also passed to zone 3 by way of conduit 4. This mixed trialkyl aluminum stream will normally comprise alkyl radicals of from 2 to about 12 carbon atoms each, and more preferably from about 4 to about 6 carbon atoms each. In zone 3, the following reaction occurs, where R represents the mixed alkyl radicals: $Al + \tfrac{3}{2}H_2 + 2Al(R)_3 \rightarrow 3Al(R)_2H$. A portion of the trialkyl aluminum feed to zone 3 can comprise triethyl aluminum introduced by way of valved conduit 5, as will be later explained. The resulting dialkyl aluminum hydride is passed by way of conduit 6 to an alkylation zone 7, wherein it is reacted with α-olefins from either or both of the sources, conduits 8 and 9. The derivation of the olefins in valved conduit 8 will be explained further on; valved conduit 9 represents an extraneous source of 1-olefins, such as a refinery by-product stream. The result of the alkylation reaction in zone 7 is to add one α-olefin to the aluminum-hydrogen bond of each dialkyl aluminum hydride, thus producing a mixed aluminum trialkyl referred to earlier. A portion, preferably at most about ⅔ of the alkylation product, is returned to synthesis zone 3 via conduit 4. The balance is passed via conduit 10 to a growth reaction zone 11, wherein it is subjected to the action of a low molecular weight olefin such as ethylene, introduced by way of conduit 12, to form the growth product. It will be noted, however, that this growth product will not conform to the usual Poisson distribution curve obtained by growing, e.g., aluminum triethyl with, e.g., ethylene, since the aluminum compound feed to the growth reaction contains a mixture of alkyl radicals, and the product distribution is based on a statistical addition of olefins to each alkyl group. The growth product is removed via conduit 13, and at least a portion thereof is passed by way of conduit 14 to an oxidation zone 15. The growth product can be represented by the formula $Al(R')_3$, where R' comprises a mixture of alkyl groups, the average size of which is larger than the average of R in the growth feed. Oxygen, e.g., air, is introduced via conduit 16 to zone 15 to produce the aluminum alkoxides, which can be represented by the formula $Al(OR')_3$. These materials are then passed via conduit 17 to hydrolysis zone 18, wherein they are admixed with water or other desired hydrolyzing agent via conduit 19 to produce the 1-alkanol product of the formula R'OH and alumina or other aluminum salt, depending upon the hydrolyzing agent selected. These materials are removed via conduit 20, and the alcohol can be purified of aluminum salt by, e.g., filtration.

It can be seen that the process of FIGURE 1 as described thus far is capable of producing a valuable alcohol product from a mixture of low molecular weight olefins as from a refinery stream, introduced via conduit 9. Detailed consideration of this process leads to the conclusion that each mole of olefin introduced by way of conduit 9 results in one mole of an alcohol product via conduit 20.

The process of FIGURE 1 is also capable of producing high molecular weight olefins, as will now be described. A portion of the growth product described in conjunction with conduit 13 can be taken by way of valved conduit 21 to a displacement zone 22, wherein it is contacted with a low molecular weight olefin such as ethylene, introduced via conduit 23. The displacement reaction can be effected either non-catalytically, i.e. thermally, or catalytically; in the latter instance, a catalyst such as nickel is introduced by way of conduit 24. Displacement product removed via conduit 25 will comprise aluminum triethyl and α-olefins of carbon chain lengths equal to the alkyl groups in the growth product, R'. This mixture is passed to a complexing separation zone 26, wherein a separation is effected between aluminum triethyl on the one hand, which is recycled via conduit 5 as noted earlier, and the mixed olefins on the other hand, which are passed via conduit 27 to a fractionation zone 28. An olefin product as desired, typically of about 10 and above carbons per molecule, is removed via conduit 29, and the remaining olefins are recycled via conduit 8 as mentioned earlier. Although conduit 8 is shown as recycling low molecular weight olefins, this is not required; for instance, a middle cut of olefins such as octene through tetradecene can be removed as product via conduit 29, and both the lower and the higher olefins present in conduit 27 can be returned via conduit 8.

Turning now to the embodiment of FIGURE 2, it is noted that this system also can be used to produce alcohols, or alcohols and olefins. The significance and operation of items 1–4, 5, 6, and 9–25 are the same in this figure as in FIGURE 1. Rather than provision being made for separate recycle of olefins and aluminum triethyl as in items 8 and 5 respectively of FIGURE 1, these two streams are returned as a mixture via conduit 31, as will be explained. When producing an olefin product in this embodiment, displacement product in conduit 25 is passed to a fractionation zone 30, rather than to a complexing zone. If ethylene is used in displacement zone 22 here, then the aluminum alkyl present in zone 30 will be aluminum triethyl, which boils at about the same point as dodecene. Thus, the fractionation in zone 30 will result in stream 31 containing not only the aluminum trialkyl but also at least the olefins boiling close to it, and preferably also those olefins boiling lower. These lower olefins are preferably included in stream 31 so that they will be upgraded to higher olefins or alcohols, although they can obviously be taken off as product by suitable fractionation along with the olefins boiling higher than the aluminum trialkyl, which are removed as product via conduit 32.

Turning next to FIGURE 3, it can be seen that this process is similar to that of FIGURE 2, and can be used to produce alcohols, or alcohols and olefins. The significance and operation of items 1–3, 9, 11–25, and 30–32 are the same in this figure as in FIGURE 2. The main difference here is the addition of a second alkylation zone 35 in parallel with alkylation zone 37, the latter being similar to zone 7 of FIGURE 2. In the present figure, synthesis zone 3 produces only, e.g., aluminum diethyl hydride, rather than a mixture of aluminum dialkyl hydrides, by virtue of operating on aluminum triethyl from conduit 34, as will be explained. A portion of the ADEH produced in zone 3 is passed via conduit 36 to alkylation zone 37, where alkylation with mixed olefins entering by way of conduits 9 and/or 31 result in production of diethyl aluminum alkyl, which can be represented by the formula $(C_2H_5)_2AlR$. This material is passed via conduit 40 to the growth zone 11, and proceeds from thence as in FIGURE 2. Another portion of the ADEH produced in zone 3 is passed by way of conduit 33 to the parallel alkylation zone 35, wherein it is alkylated with ethylene introduced via conduit 38 to produce aluminum triethyl. At least a portion of this ATE is returned to synthesis via conduit 34. If desired, another portion of the ATE can be passed by way of valved conduit 39 to growth zone 11. The process of this figure will result in still another size distribution of alkyl groups in the growth product, since growth feed stream 40 is diethyl aluminum mixed alkyls, rather than aluminum tri-mixed alkyls as in the preceding figures. When producing alcohols only by this process, as in the preceding embodiments, items 21–32 are not used. In this instance, each mole of olefin from an extraneous source 9 results in a mole of alcohol product at 20. Additionally, each mole of ATE produced in zone 35 beyond the amount required for recycle via conduit 34, i.e., each mole of ATE passed by way of conduit 39, will result in three moles of alcohol product via conduit 20. High molecular weight olefin product is produced via conduit 32.

Consideration will now be given to the unit operations effected in the various zones, i.e., 3, 7, 11, 15, 18, 22, 26, 28, 30, 35 and 37. Many of these are well-known in the literature and accordingly will be discussed only briefly here. For example, U.S. Patent 2,787,626, issued Apr. 2, 1957, to Redman, discloses the synthesis and alkylation of zones 3, 7, 35 and 37; although this patent discusses synthesis only with respect to forming diethyl aluminum hydride, the analogous reaction for forming other dialkyl aluminum hydrides from trialkyl aluminum is carried out with equal ease. U.S. Patent 2,889,385, issued June 2, 1959, to Catterall et al., discloses the growth and catalytic displacement reactions of zones 11 and 22 respectively. Copending U.S. application Ser. No. 70,771, filed Nov. 21, 1960, by Kennedy et al., discloses a thermal displacement process alternatively suitable for zone 22. The oxidation and hydrolysis of zones 15 and 18 respectively are disclosed in U.S. Patent 3,070,616, issued Dec. 25, 1962, to Flanagan. The separations in zones 28 and 30 are suitably fractional distillations which are discussed in the literature; specific pressure and temperature conditions for a given separation are within the skill of the art. A suitable complex separation useful in zone 26 is disclosed in U.S. Patent 3,153,075, issued Oct. 13, 1964, to Kroll.

The following examples are given by way of illustration, and not limitation, of the various embodiments of this invention.

Example 1

Alcohols are made by the process of FIGURE 1, the valves in conduits 5, 8 and 21 being closed, and that in conduit 9, open. The following table illustrates a material balance on a molar basis, ignoring the presence of solvent.

TABLE 1.—MATERIAL

| Conduit | Aluminum | Hydrogen | Dialkyl Aluminum Hydride | Trialkyl Aluminum | Ethylene | Makeup Olefin | Growth Product | Oxygen | Aluminum Alkoxide | Water | Alcohols | Moles Al+++ as Al$_2$O$_3$ or Al$_2$(SO$_4$)$_3$ |
|---|---|---|---|---|---|---|---|---|---|---|---|---|
| 1 | 1 | | | | | | | | | | | |
| 2 | | 1.5 | | | | | | | | | | |
| 4 | | | | 2 | | | | | | | | |
| 6 | | | 3 | 1 | | | | | | | | |
| 9 | | | | | 10 | | | | | | | |
| 10 | | | | | | 3 | | | | | | |
| 12 | | | | | | | 1 | | | | | |
| 14 | | | | | | | | 1.5 | | | | |
| 16 | | | | | | | | | 1 | | | |
| 17 | | | | | | | | | | 3 | | |
| 19 | | | | | | | | | | | 3 | |
| 20 | | | | | | | | | | | | 1 |

Example 2

Table 2, below, illustrates operation of the process of FIGURE 1 to produce both alcohols and alpha-olefins. The following material balance indicates amounts necessary for olefin and alcohol production. In the following example, all valves in conduits 5, 8, 9 and 21 are open.

TABLE 2.—MATERIAL

| Conduit | Aluminum | Hydrogen | Dialkyl Aluminum Hydride | Trialkyl Aluminum | Aluminum Triethyl | Ethylene | Makeup Olefin | Growth Product | Oxygen | Aluminum Alkoxide | Water | Alcohols | Moles Al+++ as Alumina or Al$_2$(SO$_4$)$_3$ | Displacement Olefins |
|---|---|---|---|---|---|---|---|---|---|---|---|---|---|---|
| 1 | 1 | | | | | | | | | | | | | |
| 2 | | 1.5 | | | | | | | | | | | | |
| 4 | | | | 1 | | | | | | | | | | |
| 6 | | | 3 | 2 | | | | | | | | | | |
| 8 | | | | | 1 | | | | | | | | | |
| 9 | | | | | | 4-10 | | | | | | | | |
| 12 | | | | | | | 1 | | | | | | | |
| 16 | | | | | | 3 | | | | | | | | |
| 20 | | | | | | | | 1 | | | | | | |
| 22 | | | | | | | | | 1.5 | | | | | |
| 24 | | | | | | | | | | 1 | | | | |
| 25 | | | | | | | | | | | 3 | | | |
| 27 | | | | | | | | | | | | 3 | | 2 |
| 28 | | | | | | | | | | | | | 1 | 3 |
| 29 | | | | | | | | | | | | | | 3, 1 |

Example 3

The process of FIGURE 2, when operated to produce alcohols only, is identical to Example 1.

Example 4

The process of FIGURE 2, when operated to produce both alcohols and alpha-olefins, is identical to Example 2 with the following exceptions:

| Conduit | Triethyl Aluminum | Material Olefins | AlR₃ |
|---|---|---|---|
| 4 | 0 | 0 | 2 |
| 5 | 0 | 0 | 0 |
| 8 | 0 | 0 | 0 |
| 27 | 0 | 1 | 0 |
| 29 | 0 | 2 | 2 |
| 31 | 1 | 1 | 1 |
| 32 | 0 | 0 | 0 |

Example 5

The following table illustrates operation of the process of FIGURE 3 to produce alcohols only, ignoring the presence of solvent, on a molar basis. The valves in conduits 21, 31 and 39 are closed, and that in conduit 9, open.

TABLE 3.—MATERIAL

| Conduit | Aluminum | Hydrogen | Diethyl Aluminum Hydride | Triethyl Aluminum | Diethyl Aluminum Alkyl | Ethylene | Makeup Olefin | Growth Product | Oxygen | Aluminum Alkoxide | Water | Alcohols | Moles Al⁺⁺⁺ as Alumina or Al₂(SO₄)₃ |
|---|---|---|---|---|---|---|---|---|---|---|---|---|---|
| 1 | 1 | | | | | | | | | | | | |
| 2 | | 1.5 | | | | | | | | | | | |
| 9 | | | | | | | | | | | | | |
| 12 | | | | | | | | | | | | | |
| 14 | | | | | | | | | | | | | |
| 16 | | | | | | 4-10 | | | | | | | |
| 17 | | | | | | | 1 | | | | | | |
| 19 | | | | | | | | 1 | | | | | |
| 20 | | | | | | | | | 1.5 | | | | |
| 33 | | | 2 | | | | | | | 1 | | | |
| 34 | | | 3 | | | | | | | | 1 | 3 | |
| 36 | | | | | | | | | | | 3 | | |
| 38 | | | | 2 | | | | | | | | | |
| 40 | | | | | 1 | | | | | | | | 1 |

Example 6

Table 4, above, illustrates operation of the process of FIGURE 3 to produce both alcohols and alpha-olefins. The following material balance indicates amounts necessary for olefin and alcohol production. All valves are open.

TABLE 4.—MATERIAL

| Conduit | Aluminum | Hydrogen | Diethyl Aluminum Hydride | Triethyl Aluminum | Diethyl Aluminum Alkyl | Makeup Olefins | Ethylene | Displacement Olefins | Growth Product | Oxygen | Aluminum Alkoxide | Water | Alcohols | Moles Al⁺⁺⁺ as Alumina or Al₂(SO₄)₃ |
|---|---|---|---|---|---|---|---|---|---|---|---|---|---|---|
| 1 | 1 | | | | | | | | | | | | | |
| 2 | | 1.5 | | | | | | | | | | | | |
| 12 | | | | | | | | | | | | | | |
| 14 | | | | | | | 4-10 | | | | | | | |
| 16 | | | | | | | | | | | | | | |
| 17 | | | | | | | | | | | | | | |
| 19 | | | | | | | | | 1 | | | | | |
| 20 | | | | | | | | | | 1.5 | | | | |
| 21 | | | | | | | | | | | | | | |
| 23 | | | | | | | | 3 | | | | | | |
| 25 | | | | 1 | | | | | | | | | | |
| 31 | | | | 1 | | | | 0.5 | | | | | | |
| 32 | | | | 2 | | | 2 | 2.5 | | | | | | |
| 33 | | | 2 | | | | | | | | | | | |
| 34 | | | 3 | | | | | | | | 1 | | | |
| 36 | | | | | | | | | | | | 3 | 3 | |
| 38 | | | | 0 | | | | | | | | | | |
| 39 | | | | 2 | | | | | | | | | | |
| 40 | | | | | | | | | | | | | | 1 |

Example 7

The process of Example 5 is operated with n-butane-1 comprising the feed in conduit 9. The growth reactor is operated to obtain an "M" value (mean number of ethylene additions per alkyl chain) of 5. The product of this process is illustrated in the right-hand column below, while for purposes of comparison, the product analysis when using only ethylene is illustrated in the center column.

| Alcohol | Case A Wt. percent ($AlEt_3$) | Case B Wt. percent ($AlEt_2Bu$) |
|---|---|---|
| $C_2H_5OH$ | 0.11 | 0.07 |
| $C_4H_9OH$ | 1.11 | 0.76 |
| $C_6H_{13}OH$ | 4.26 | 3.20 |
| $C_8H_{17}OH$ | 9.49 | 7.77 |
| $C_{10}H_{21}OH$ | 14.66 | 13.00 |
| $C_{12}H_{25}OH$ | 17.58 | 16.70 |
| $C_{14}H_{29}OH$ | 17.23 | 17.41 |
| $C_{16}H_{33}OH$ | 13.85 | 15.02 |
| $C_{18}H_{37}OH$ | 9.79 | 11.15 |
| $C_{20}H_{41}OH$ | 6.03 | 7.29 |
| $C_{22}H_{45}OH$ | 3.41 | 4.27 |
| $C_{24}H_{49}OH$ | 1.72 | 2.27 |
| $C_{26}H_{53}OH$ | 0.78 | 1.09 |
|  | 100.02 | 99.99 |

Example 8

The process of Example 7 is operated, substituting octadecene for the butene. Again, the right column illustrates product analysis, and the center column shows operation with only ethylene, for comparison.

| Alcohol | Case C Wt. percent ($AlEt_3$) | Case D Wt. percent $AlEt_2$ ($C_{18}H_{37}$) |
|---|---|---|
| $C_2H_5OH$ | 0.11 | 0.05 |
| $C_4H_9OH$ | 1.11 | 0.52 |
| $C_6H_{13}OH$ | 4.26 | 2.03 |
| $C_8H_{17}OH$ | 9.49 | 4.52 |
| $C_{10}H_{21}OH$ | 14.66 | 6.98 |
| $C_{12}H_{25}OH$ | 17.58 | 8.37 |
| $C_{14}H_{29}OH$ | 17.23 | 8.20 |
| $C_{16}H_{33}OH$ | 13.85 | 6.59 |
| $C_{18}H_{37}OH$ | 9.79 | 4.81 |
| $C_{20}H_{41}OH$ | 6.03 | 3.94 |
| $C_{22}H_{45}OH$ | 3.41 | 4.86 |
| $C_{24}H_{49}OH$ | 1.72 | 6.97 |
| $C_{26}H_{53}OH$ | 0.78 | 8.82 |
| $C_{28}H_{57}OH$ |  | 9.41 |
| $C_{30}H_{61}OH$ |  | 8.46 |
| $C_{32}H_{65}OH$ |  | 6.35 |
| $C_{34}H_{69}OH$ |  | 4.27 |
| $C_{36}H_{73}OH$ |  | 2.51 |
| $C_{38}H_{77}OH$ |  | 1.37 |
| $C_{40}H_{81}OH$ |  | 0.67 |
| $C_{42}H_{85}OH$ |  | 0.29 |
|  | 100.02 | 100.00 |

Having thus described the invention by providing specific examples thereof, it is to be understood that no undue limitations or restrictions are to be drawn by reason thereof and that many variations and modifications are within the scope of the invention.

What is claimed is:

1. A process for producing aluminum alkyls from ethylene and a mixture of straight-chain alpha-olefins which comprises:
   (a) reacting in a synthesis zone metallic aluminum hydrogen, and $Al(R)_3$, wherein R represents straight-chain alkyl groups of mixed carbon chain lengths, to produce a stream comprising $Al(R)_2H$,
   (b) withdrawing said stream comprising $Al(R)_2H$ from said synthesis zone and passing same to an alkylation zone,
   (c) reacting the stream of step (b) in the alkylation zone with said mixture of straight-chain alpha-olefins to produce $Al(R)_3$,
   (d) returning a portion of the $Al(R)_3$ produced in step (c) to the reacting of step (a),
   (e) passing another portion of the $Al(R)_3$ produced in step (c) to a growth zone.
   (f) reacting the $Al(R)_3$ in said growth zone with ethylene to produce $Al(R')_3$ where R' represents alkyl groups of mixed carbon chain lengths, the average molecular weight of R' being greater than that of said R,
   (g) passing a portion of the $Al(R')_3$ produced in step (f) to a displacement zone,
   (h) reacting said $Al(R')_3$ in said displacement zone with ethylene to produce aluminum triethyl and mixed alpha-olefins of the same carbon chain length as said R',
   (i) contacting the product of said displacement zone of step (h) with a complexing agent whereby there is formed a complex of said aluminum triethyl and said complexing agent,
   (j) separating said mixed alpha-olefins of step (h) from said complex of step (i),
   (k) fractionating the mixed alpha-olefins of step (j) to produce a high molecular weight fraction and a low molecular weight fraction.
   (l) removing said high molecular weight fraction of step (k) as olefin product,
   (m) returning said low molecular weight fraction of step (k) as said mixture of step (c),
   (n) regenerating said complex of step (j) to recover aluminum triethyl, and
   (o) returning the aluminum triethyl of step (n) as a portion of said $Al(R)_3$ of step (a).

2. The process of claim 1 wherein said low molecular weight fraction of step (k) comprises mixed alpha-olefins having between about 4 and about 12 carbon atoms per molecule.

3. A process for producing aluminum alkyls from ethylene and a mixture of straight-chain alpha-olefins which comprises:
   (a) reacting in a synthesis zone metallic aluminum hydrogen, and $Al(R)_3$, wherein R represents straight-chain alkyl groups of mixed carbon chain lengths, to produce a stream comprising $Al(R)_2H$,
   (b) withdrawing said stream comprising $Al(R)_2H$ from said synthesis zone and passing same to an alkylation zone,
   (c) reacting the stream of step (b) in the alkylation zone with said mixture of straight-chain alpha-olefins to produce $Al(R)_3$,
   (d) returning a portion of the $Al(R)_3$ produced in step (c) to the reacting of step (a),
   (e) passing another portion of the $Al(R)_3$ produced in step (c) to a growth zone,
   (f) reacting the $Al(R)_3$ in said growth zone with ethylene to produce $Al(R')_3$ where R' represents alkyl groups of mixed carbon chain lengths, the average molecular weight of R' being greater than that of said R,
   (g) passing a portion of the $Al(R')_3$ produced in step (f) to a displacement zone,
   (h) reacting said $Al(R')_3$ in said displacement zone with ethylene to produce aluminum triethyl and mixed alpha-olefins of the same carbon chain length as said R',
   (i) fractionating the product of said displacement zone of step (h) to produce a mixture of alpha-olefins having at least about 12 carbon atoms per molecule as a product, and a mixture of aluminum triethyl and mixed alpha-olefins of at most about 12 carbon atoms per molceule, and
   (j) returning the latter mixture of step (i) to said alkylation zone of step (c) to serve as said mixture of straight-chain alpha-olefins therein.

4. The process of claim 3 wherein said mixed alpha-olefins of step (i) comprise mixed alpha-olefins having between about 4 and about 12 carbon atoms per molecule.

5. A process for producing aluminum alkyls from a plurality of alpha-olefins of varied carbon chain lengths which comprises:
   (a) reacting in an alkylation zone said plurality of alpha-olefins with an aluminum dialkyl hydride of the formula $Al(R)_2H$, where R comprises n-alkyl of at most about 12 carbon atoms, to produce Al(R)$_3$, (a) reacting in an alkylation zone said plurality of alpha-olefins with an aluminum dialkyl hydride of the formula Al(R)$_2$H, where R comprises n-alkyl of at most about 12 carbon atoms, to produce Al(R)$_3$, (b) passing said Al(R)$_3$ to a growth zone and reacting it therein with ethylene to produce Al(R')$_3$ where R' represents alkyl groups of mixed carbon chain lengths, the average molecular weight of R' being greater than that of said R, (c) passing a portion of said Al(R')$_3$ of step (b) to a displacement zone, (d) reacting said Al(R')$_3$ in said displacement zone with ethylene to produce aluminum triethyl and mixed alpha-olefins of the same carbon chain length as said R', (e) separating the product of step (d) into a stream comprising mixed alpha-olefins of at least about 12 carbon atoms per molecule and a stream comprising aluminum triethyl and mixed alpha-olefins of at most about 12 carbon atoms per molecule, (f) removing the former stream of step (e) as a product of the process, and (g) returning the latter stream of step (e) to the alkylation of step (a) as said plurality of alpha-olefins.

6. The process of claim 5 wherein said aluminum dialkyl hydride of step (a) is derived by:

(h) reacting in a synthesis zone metallic aluminum, hydrogen, and aluminum triethyl to produce diethyl aluminum hydride, (i) passing a first portion of said aluminum diethyl hydride of step (h) to step (a) as said aluminum dialkyl hydride, (j) passing a second portion of said aluminum diethyl hydride of step (h) to a second alkylation zone, (k) reacting said aluminum diethyl hydride in said second alkylation zone with ethylene to produce aluminum triethyl, and (l) passing said aluminum triethyl of step (k) to said growth zone of step (b) as a portion of said Al(R)$_3$.

References Cited

UNITED STATES PATENTS

| | | | |
|---|---|---|---|
| 2,787,626 | 4/1957 | Redman | 260—448 |
| 2,863,896 | 12/1958 | Johnson | 260—632 |
| 3,035,105 | 5/1962 | Hoffman | 260—683.15 |
| 3,042,696 | 7/1962 | Aldridge | 260—632 |
| 3,153,075 | 10/1964 | Kroll | 260—448 |
| 3,207,770 | 9/1965 | Ziegler et al. | 260—448 |
| 3,227,773 | 1/1966 | Roming | 260—683.15 |
| 3,249,648 | 5/1966 | Carter et al. | 260—448 |
| 3,278,262 | 10/1966 | Poe et al. | 260—632 |
| 3,293,274 | 12/1966 | Feighner | 260—448 |
| 3,328,446 | 6/1967 | Poe et al. | 260—448 |
| 2,889,385 | 6/1959 | Catterall et al. | 260—448 XR |
| 3,207,771 | 9/1965 | Zosel | 260—448 |
| 3,210,435 | 10/1965 | Kennedy et al. | 260—448 |

OTHER REFERENCES

Lobo et al.: "Chemical Engineering Progress," vol. 58, No. 5, (1962), pp. 85 to 88, TPI.A6.

Ziegler et al.: (I), "Chem. Abstracts," vol. 50, (1956), cols. 6303–04, QDIA51.

TOBIAS E. LEVOW, *Primary Examiner.*

H. M. S. SNEED, *Assistant Examiner.*

U.S. Cl. X.R.

260—632, 677, 683.15